United States Patent [19]

Kagawa

[11] Patent Number: 5,357,601
[45] Date of Patent: Oct. 18, 1994

[54] APPARATUS FOR PROCESSING SUPERIMPOSED IMAGE INFORMATION BY DESIGNATING SIZES OF SUPERIMPOSED AND SUPERIMPOSING IMAGES

[75] Inventor: Hideaki Kagawa, Tokyo, Japan

[73] Assignee: Kabushiki Kaisha Toshiba, Kawasaki, Japan

[21] Appl. No.: 712,728

[22] Filed: Jun. 10, 1991

[30] Foreign Application Priority Data

Jun. 12, 1990 [JP] Japan .................................. 2-153583

[51] Int. Cl.⁵ .............................................. G06F 15/62
[52] U.S. Cl. ................................... 395/135; 395/133; 395/139; 382/47
[58] Field of Search ................................. 395/133–139, 395/125, 127, 145, 147, 155, 157, 158; 382/47

[56] References Cited

U.S. PATENT DOCUMENTS 4,730,260  3/1988  Mori et al. ............................ 395/135
4,731,743  3/1988  Blancato ............................... 395/135
4,872,064  10/1989 Tutt et al. ............................. 382/47

*Primary Examiner*—Heather R. Herndon
*Assistant Examiner*—Almis Jankus
*Attorney, Agent, or Firm*—Cushman, Darby & Cushman

[57] ABSTRACT

First image data read out from an image information apparatus is stored in a page memory through a buffer memory and is also displayed on a CRT (cathode ray tube) display unit. A second image data subsequently read is converted into a predetermined size under the control of a CPU (central processing unit) and stored in the first image data stored in the page memory in a superimposed fashion.

6 Claims, 4 Drawing Sheets

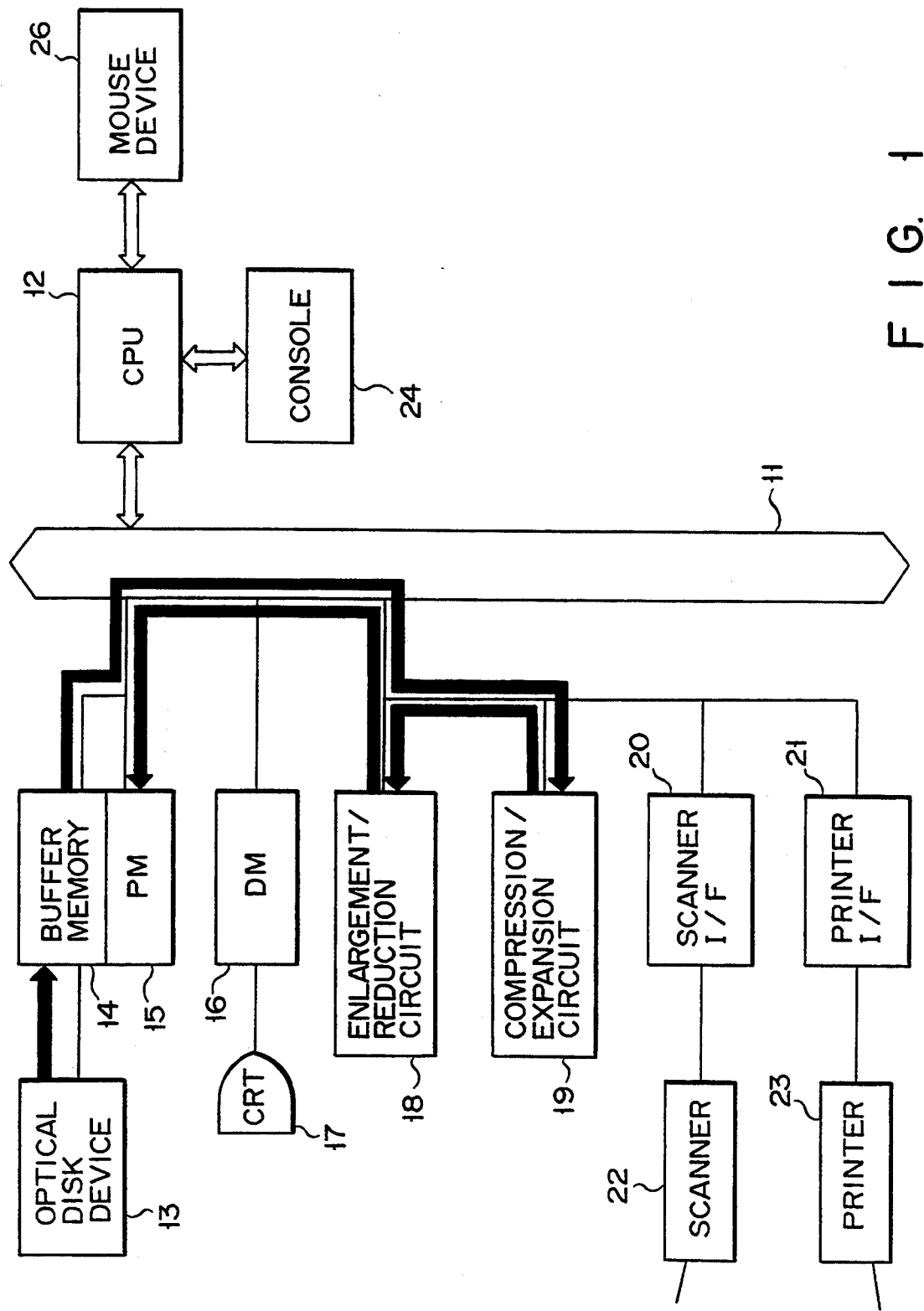
F I G. 1

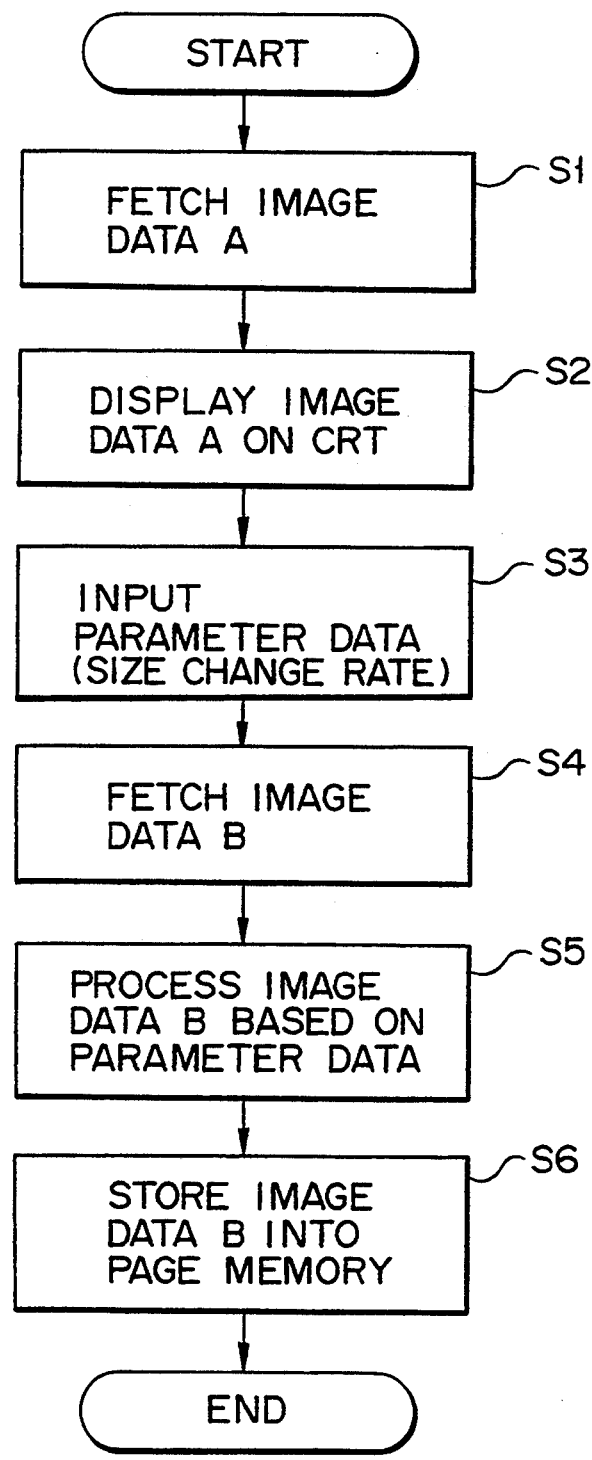
F I G. 3

APPARATUS FOR PROCESSING SUPERIMPOSED IMAGE INFORMATION BY DESIGNATING SIZES OF SUPERIMPOSED AND SUPERIMPOSING IMAGES

BACKGROUND OF THE INVENTION

1. Field of the Invention

The present invention relates to an information processing apparatus for use in storing a plurality of pieces of image information in a superimposed state.

2. Description of the Related Art

Conventionally, first and second pieces of image information are read out from an optical disk and the second image information is superimposed upon the first image information to form a single image information by the edit processing. In a conventional image information processing apparatus, when the first and second pieces of image information read from the optical disk have a size A4 and are superimposed with each other, the first image information is stored in a first image memory and the second image information is stored in a second image memory, both in the size A4. Then, a superimposed area is designated on the first image information, and a superimposing area on the second image information is designated on a display screen. After the area designation is performed, image information in the designated area in the second image information is read out from the second image memory, reduced in a predetermined size by an enlarging and reducing circuit and superimposed upon the designated area of the first image information stored in the first image memory. Accordingly, in the conventional image information processing apparatus, two image memories of the storage capacity of size A4, or an image memory of storage capacity of two images of size A4 must be provided.

Conventionally, when an image is superimposed upon other image, there must be provided an image memory having a predetermined storage capacity for editing and designating an area of the superimposed image, which unavoidably increases the cost of the apparatus.

SUMMARY OF THE INVENTION

Accordingly, it is an object of the present invention to provide an information processing apparatus in which a storage capacity of a memory can be reduced to thereby make the information processing apparatus less expensive.

More specifically, it is an object of the present invention to provide an information processing apparatus in which edition such as superimposing one image upon another, can be carried out efficiently in a short period of time.

As an aspect of the present invention, an information processing apparatus is comprised of a first memory for storing first information read out from an information memory apparatus in a predetermined size, a circuit for inputting particular address of the first memory at its area in which the first information is stored and parameter data specifying a size of second information stored in this address position, and a memory for storing the second information in the first memory in accordance with the parameter data.

Information read out from an external memory, for example an optical disk, is converted into the information of a predetermined size and stored in an arbitrary area of an information storage region in an arbitrary size, regardless of an input size. Accordingly, if other information has been previously stored in this information storage region, then the new information can be superimposed upon the previously stored information.

The above and other objects, features, and advantages of the present invention will become apparent in the following detailed description of an illustrative embodiment thereof to be read in conjunction with the accompanying drawings, in which like reference numerals are used to identify the same or similar objects.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing an arrangement of an information processing apparatus according to an embodiment of the present invention;

FIG. 3 is a flowchart to which references will be made in explaining operation of this embodiment.

DETAILED DESCRIPTION OF THE PREFERRED EMBODIMENTS

Figure 2:
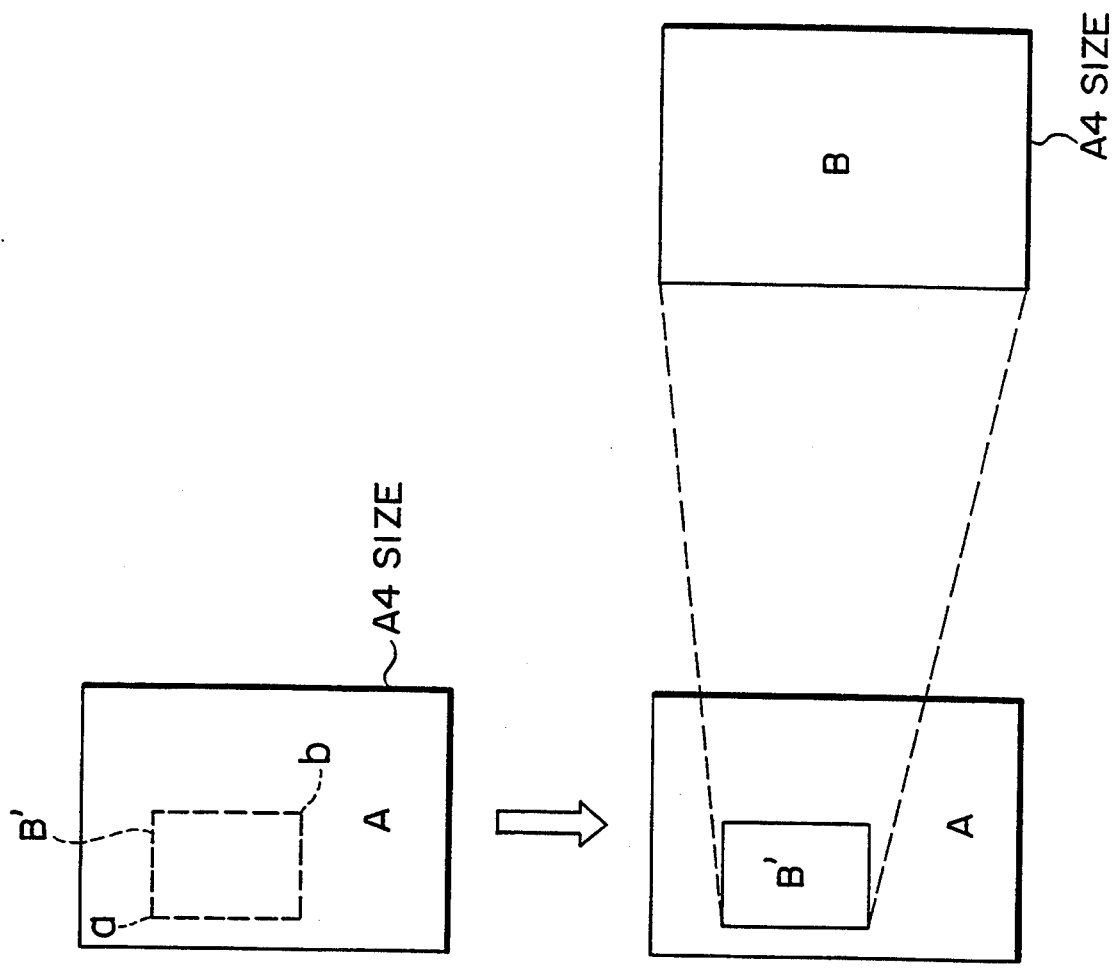
FIGS. 2A and 2B are schematic diagrams showing an example of a displayed image of this embodiment.

An information processing apparatus according to the embodiment of the present invention will hereinafter be described with reference to the drawings. FIG. 1 is a block diagram showing an arrangement of the embodiment according to the present invention. This whole circuit is controlled by a CPU (central processing unit) 12 connected to an image bus 11.

Data of a first image A of size A4 read out from an optical disk device 13 is stored through a buffer memory 14 to a page memory 15 having a storage capacity of, for example, an image of one page of size A4 in the size of A4. Data of the image A stored in the page memory 15 is also supplied through a display memory 16 to a CRT (cathode ray tube) 17, thereby being displayed as the image of size A4 as shown in FIG. 2A.

Reduced data of a second image B of size A4 read out from the optical disk device 13 supplied to the page memory 15 is supplied through the display memory 16 to the CRT 17, thereby being displayed. The page memory 15 is connected through the image bus 11 to a compressing and expanding circuit 19 for compressing pixel data and for expanding the compressed pixel data, where the image bus also connects it to a scanner interface 20 and a printer interface 21. The scanner interface 20 and the printer interface 21 are respectively connected to a scanner 22 and a printer 23 to allow data communication between the image bus 11 and the scanner 22 or printer 23. A console 24 is connected to the CPU 12 to input image edit parameters, such as size of image data, direction of image data superimposed position data and so on.

Operation of the embodiment shown in FIG. 1 will hereinafter be described in detail with reference to FIGS. 2A, 2B, a flowchart of FIG. 3, and a menu picture of FIG. 4.

Figure 4:
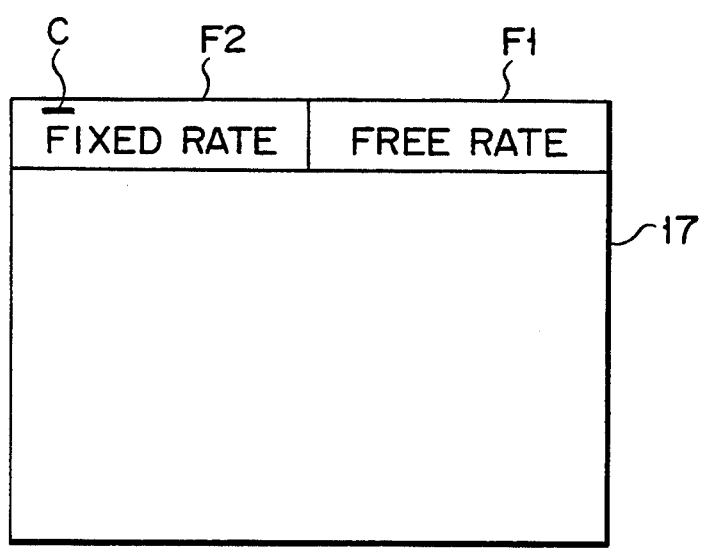
FIG. 4 is a schematic diagram showing an example of an image edit menu displayed on the picture screen of the CRT of FIG. 1.

When the image B of size A4 is reduced in the predetermined size, as shown by image B' in FIG. 2B and superimposed upon the image A (FIG. 2A) of size A4 read from the optical disk device 13, by operating an edit key (not shown) on the console 24, the menu picture shown in FIG. 4 is initially displayed on the CRT 17 under the control of the CPU 12.

when the operator selects a free rate F1 on the menu picture by moving a cursor C by a mouse 26, the CPU 12 is made ready to receive a reducing ratio (%) input by the console 24. For example, when the operator inputs "30" at the console 24, then the image B of size A4 read from the optical disk device 13 is supplied to the enlarging and reducing circuit 18 which produces data of an image B' which is reduced by 30% of the size A4 under the control of the CPU 12.

The size of the image B' can be specified by moving the cursor C on the image A displayed on the CRT 17 by the mouse 26. For example, the size of the image B' can be specified only by clicking the upper left corner point a and the lower right corner point b of the region B' on the display screen of the image A shown in FIG. 2A by the mouse 26.

The vertical/horizontal ratio of the reduced image B' can be set at a fixed value of a fixed format size (e.g. a A-series size such as A4, A5, A6, ... ) by moving the cursor C at the corner point b linearly with respect to the corner point a while maintaining the ratio at the fixed value. The vertical/horizontal ratio of the reduced image B' may be set at a free rate in the ratio can be set freely by moving the corner point b randomly with respect to the corner point a.

Further, when the fixed rate F2, on the menu picture shown in FIG. 4, is selected by operating the mouse 26, the menu picture is changed to a menu picture concerning the fixed rate F2 so that A1, A2, A3, A4, A5, B1, B2, B3, B4, B5, and so on are displayed. For example, when the user selects B5 by moving the cursor C by the mouse 26, then the reducing ratio data (30%) corresponding to the reducing ratio between A4 and B5 is supplied from the CPU 12 to the enlarging and reducing circuit 18.

Initially, at step S1 of FIG. 3, the data of image A of size A4 is read out from the optical disk device 13 and stored in the page memory 15 having the storage capacity of size A4 in size A4 via the buffer memory 14. In the next step S2, the data of image A stored in the page memory 15 is displayed on the CRT 17 through the display memory 16. The displayed condition of the image A on the CRT 17 is represented in FIG. 2A.

Then, the processing proceeds to step S3, wherein the corner point a of the reduced image B' is designated on the CRT 17 by the console 24 or the mouse 26 as shown in FIG. 2A and position data of the corner point a is input as edit parameter. Simultaneously, the size of the image B' superimposed is also designated and input as parameter, where the parameter data is stored in the CPU 12. Thus, by designating the corner point a and the size of the image B', it is possible to determine the area B' to be superimposed on the image A.

Under this condition, the processing proceeds to the next step S4, wherein the image B superimposed upon the position B' of the image A is read out from the optical disk device 13. This image B is also stored in the optical disk device 13 in the size A4 with size data representing the size A. The data of image B is supplied through the buffer memory 14 to the enlarging and reducing circuit 18 in step S5. Therefore, the image B of size A4 is reduced to the image B' whose size is reduced by 30% of the predetermined one in accordance with the parameter input at step S3. As described above, when the parameter is input, the size of the superimposed image B' is specified, the reducing ratio from the size A4 is calculated by the CPU 12 and the data of the image B' reduced by the predetermined reducing ratio is obtained in accordance with this reducing ratio.

In the next step S6, the data of the image B' reduced to the predetermined size is supplied to the page memory 15, in which it is written in the position B' of FIG. 2A in accordance with the input parameter. As described above, the image data in which the image B' is superimposed upon the predetermined position of the image A of size A4 is stored within the page memory 15 having the storage capacity of the size A4 as shown in FIG. 2B. The data stored within the page memory 15 is transferred to the display memory 16, if necessary and displayed on the CRT 17, as shown in FIG. 2B.

When the position data of the corner point a and the data of the reduced image area B' shown in FIG. 2A are entered in the step S3 of FIG. 3, it is also possible to calculate the size changing ratio between the image B of A4 size and the reduced image area B' of the designated size by means of the CPU 12, while maintaining the vertical/horizontal ratio of the fixed format size. when the size of the reduced image area B' is freely designated, the size changing ratio can be calculated by the CPU 12 by using a size of a vertical or horizontal side of the image B and the area B', or by so determining an area of the image area B' being superimposed that an image area is the maximum in the image area B'.

If in step S3 of FIG. 3 compressing or expanding data is provided as parameter, then the data of the image B read out from the optical disk device 13 upon processing the image B at step S5 is processed by the compressing and expanding circuit 19, transferred to the enlarging and reducing circuit 18, and stored in the page memory 15.

Of course, the capacity of the page memory 15 may be modified so as to correspond to the size of A3, the size of the image A is enlarged from A4 to A3 and stored in the page memory 15, on which the image B can be superimposed without reduction or in a reduced form. Further, if the images A and B are stored in the optical disk device 13 under the condition such that they are rotated each other by 90°, the image B or A to be superimposed may be rotated initially by, for example, 90° so as to be changed in direction and then stored in the page memory 15.

While both the images A and B are read out from the optical disk device 13 as described above, any or both of the images A and B may be obtained from the scanner 22 and inputted via the scanner interface 20. In this case, the size of the images A and B read by the scanner 22 may be entered from a size input device such as a mouse, the size and image area B' being used to determine the size changing ratio.

As described above, according to this invention, the image edit work can be made efficiently, and a required time for such edit work can be reduced. Also, the storage capacity of the image memory utilized can be reduced as compared with the prior art, so that the extra memory capacity can be utilized in other purposes. Therefore, it is possible to obtain the information processing apparatus in which the image memory can be utilized efficiently.

Having described a preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information processing apparatus comprising:
    memory means for storing first information, said memory means having an image superimposed area on which images are superimposed;
    image receiving means for receiving second information;
    means for designating said image superimposed area in said memory means and for determining size data corresponding to said image superimposed area, where said image superimposed area size data includes lengths corresponding to two adjacent sides of said image superimposed area;
    means for obtaining size data of said second information, where said second information size data includes lengths corresponding to two adjacent sides of said second information;
    means for determining a size changing ratio of said second information in accordance with said lengths of two adjacent sides of said image superimposed area and said lengths of corresponding two adjacent sides of said second information;
    means for reading out said second information from said image receiving means; and
    means for changing the size of said second information read out by said reading mean according to said size changing ratio to create resized second information and for supplying said re-sized second information to said image superimposed area to be superimposed on said first information.

2. An information processing apparatus according to claim 1, which further comprises means for displaying the first information stored in said memory means; and wherein said designating means includes means for displaying a cursor on said display means and a mouse for moving said cursor on said display means.

3. An information processing apparatus according to claim 1, wherein said obtaining means includes a console which designates a size of said second information.

4. An information processing apparatus according to claim 1, wherein said changing means includes an enlarging and reducing circuit means for converting the size of said second information in response to the size changing ratio obtained by said determining means.

5. An information processing apparatus according to claim 1, further comprising second reading means for reading out said first information, said first information being stored in said memory means.

6. A processing apparatus for superimposing image information, comprising:
    memory means for storing first image information on which second image information is superimposed;
    first designating means for designating a size of said memory means where said first image information is stored as a superimposing area for superimposing images;
    second designating means for designating a size of said second image information to be superimposed on said first image information and for designating an execution of reading out said second image information;
    means for reading out said second image information in accordance with designation performed by said second designating means;
    means for determining a size changing ratio of said second image information in accordance with the size of the superimposing area designating by first designating means and the size information designated by said second designating means;
    means for changing the size of said second image information read out by said reading means in accordance with the size changing ratio; and
    means for superimposing the second image information changed by said changing means on the superimposing area of said first image information.

* * * * *